US010041219B2

(12) United States Patent
Salemi

(10) Patent No.: US 10,041,219 B2
(45) Date of Patent: Aug. 7, 2018

(54) REUSABLE HAND SCRAPERS FOR WASTE REMOVAL

(71) Applicant: Helen E. Salemi, Corona, CA (US)

(72) Inventor: Helen E. Salemi, Corona, CA (US)

( * ) Notice: Subject to any disclaimer, the term of this patent is extended or adjusted under 35 U.S.C. 154(b) by 0 days.

(21) Appl. No.: 15/470,674

(22) Filed: Mar. 27, 2017

(65) Prior Publication Data

US 2017/0198450 A1 Jul. 13, 2017

Related U.S. Application Data

(63) Continuation-in-part of application No. 14/801,907, filed on Jul. 17, 2015.

(51) Int. Cl.

| | |
|---|---|
| ***E01H 1/12*** | (2006.01) |
| ***A47L 13/022*** | (2006.01) |
| ***A47L 13/08*** | (2006.01) |
| ***B09B 5/00*** | (2006.01) |
| ***B65F 5/00*** | (2006.01) |

(52) U.S. Cl.
CPC .......... *E01H 1/1206* (2013.01); *A47L 13/022* (2013.01); *A47L 13/08* (2013.01); *B09B 5/00* (2013.01); *B65F 5/00* (2013.01); *E01H 1/12* (2013.01); *E01H 1/1213* (2013.01); *E01H 2001/124* (2013.01); *E01H 2001/1226* (2013.01)

(58) Field of Classification Search
CPC .......... E01H 1/1206; E01H 2001/1226; E01H 2001/124; E01H 2001/126; E01H 1/12; E01H 1/1213; A41D 19/0075; A47L 13/022; A47L 13/08; B09B 5/00; B65F 5/00
USPC .......................................................... 294/1.3
See application file for complete search history.

(56) References Cited

U.S. PATENT DOCUMENTS

| | | | | | |
|---|---|---|---|---|---|
| 3,978,540 | A * | 9/1976 | Peck | E01H 1/1206 | 294/1.3 |
| 4,909,553 | A * | 3/1990 | Hantover | E01H 1/1206 | 15/257.1 |
| 5,222,777 | A * | 6/1993 | Clonch | E01H 1/1206 | 294/1.3 |
| 5,282,660 | A * | 2/1994 | Halling | E01H 1/1206 | 15/257.1 |
| 5,704,670 | A * | 1/1998 | Surplus | A41D 19/0075 | 2/159 |
| 5,836,629 | A * | 11/1998 | Hobart | E01H 1/1206 | 294/1.3 |
| 6,045,170 | A * | 4/2000 | Allen | E01H 1/1206 | 294/1.3 |
| 6,850,162 | B2 * | 2/2005 | Cacioli | G01M 3/027 | 2/159 |
| 7,976,083 | B2 * | 7/2011 | Black | E01H 1/1206 | 294/1.3 |
| 8,292,338 | B1 * | 10/2012 | Baghdasaryan | E01H 1/1206 | 294/1.3 |
| 2013/0104284 | A1 * | 5/2013 | Kantrowitz | A41D 19/0031 | 2/161.7 |

(Continued)

*Primary Examiner* — Dean J Kramer

(57) ABSTRACT

Reusable hand scrapers for waste removal include a pair of scrapers configured to manipulate waste into a bag when the bag is positioned over the waste. Each of the scrapers has a strap being configured to be wrapped around a user's hand for leverage when in use. A hazard detection unit and an alert device are further provided, enabling the user to be alerted if a hazardous material is detected.

14 Claims, 10 Drawing Sheets

(56) References Cited

U.S. PATENT DOCUMENTS

2014/0265381 A1* 9/2014 Joseph-de Saram . E01H 1/1206
294/1.3

* cited by examiner

REUSABLE HAND SCRAPERS FOR WASTE REMOVAL

This application is a continuation in part of U.S. patent application Ser. No. 14/801,907 filed Jul. 17, 2015.

FIELD OF THE INVENTION

The present invention relates generally to waste disposal devices. More particularly, the present invention pertains to a new disposal device for collecting and retaining waste for disposal.

BACKGROUND OF THE INVENTION

Aside from civilians, law enforcement officers, government officials, and the military may encounter substances they may have to remove, many of these removable in a practical manner only by hand. Police, in particular in collecting evidence use rubber (or other material) gloves so as not to contaminate that evidence. It is common knowledge that both police and military are having to confront a broad range of devices used by terrorist and criminal elements, one class of which is "improvised explosive devices" (IED), but devices not limited to explosives. Radiological elements, such as the commonly found Cesium used in medical settings has been found to fall into malevolent hands, and there is concern that these could be used as personnel dispersement devices. Chemicals, such as hydrofluoric acid, capable of dissolving any material containing oxides or other acids can be integrated with a material, thus exposing the handler to unforeseen harm. In normal circumstances, the person merely scoops up the substance and places it in a container. However, there are circumstances that the threat level can be raised considerably, as in the placement or dispersal of chemical, biological, or radiological agents for which normal gloves and evidence bags are not sufficient. Prior to the collection of the material it is necessary to do a scan of the area for such substances by detectors, something that probably should be done, anyway. However, when human lives are involved, there may be emergency situations that time does not allow for such activity. Even if scans can be performed, it still is desirable to have a way to efficaciously remove small hazardous substances and objects. This larger subset of circumstances obviously includes the normal situations, such as animal waste, decomposing body parts, chemical spills (as in laboratories), and so forth.

SUMMARY OF THE INVENTION

An embodiment of the disclosure meets the needs presented above by generally comprising a pair of scrapers. The scrapers may be manipulated to urge animal waste or other waste into a bag when the bag is positioned over the animal waste. A closure is coupled to the bag such that the closure may retain the animal waste in the bag. The scrapers furthermore have a hazard detection unit comprising one or more hazard sensors that trigger an alert if hazardous material or conditions are detected.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

DETAIL DESCRIPTIONS OF THE INVENTION

Figure 1:
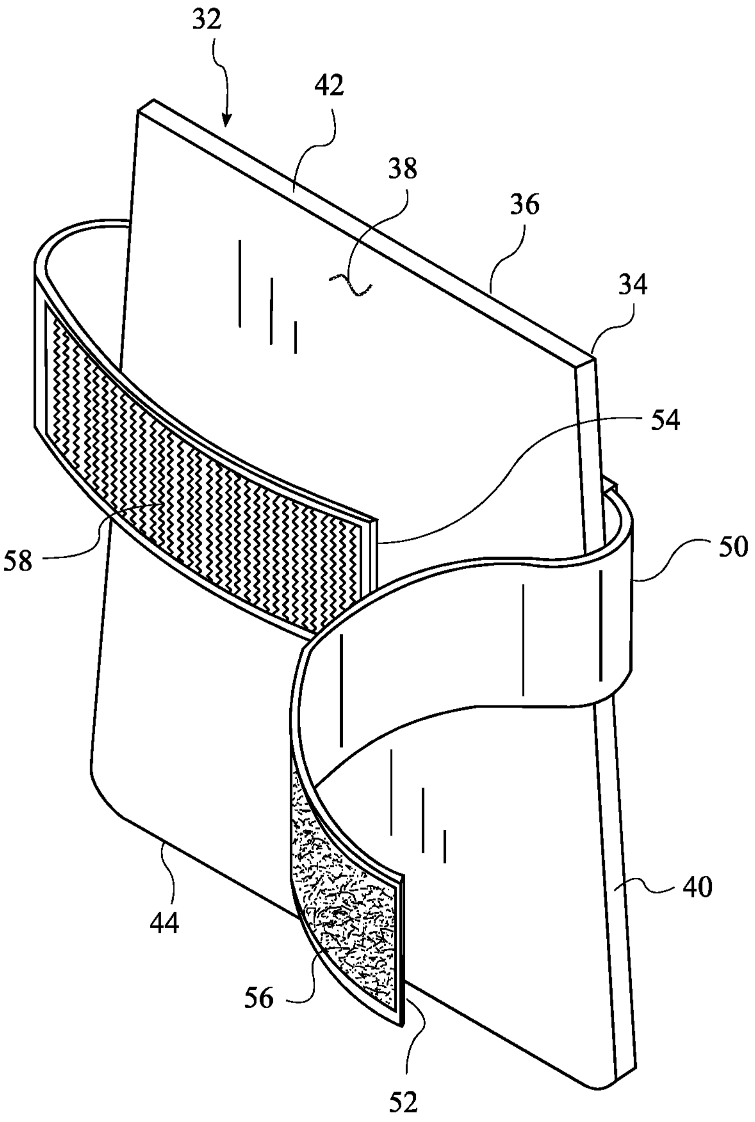
FIG. 1 is a front perspective view of an embodiment of the present invention.
Figure 2:
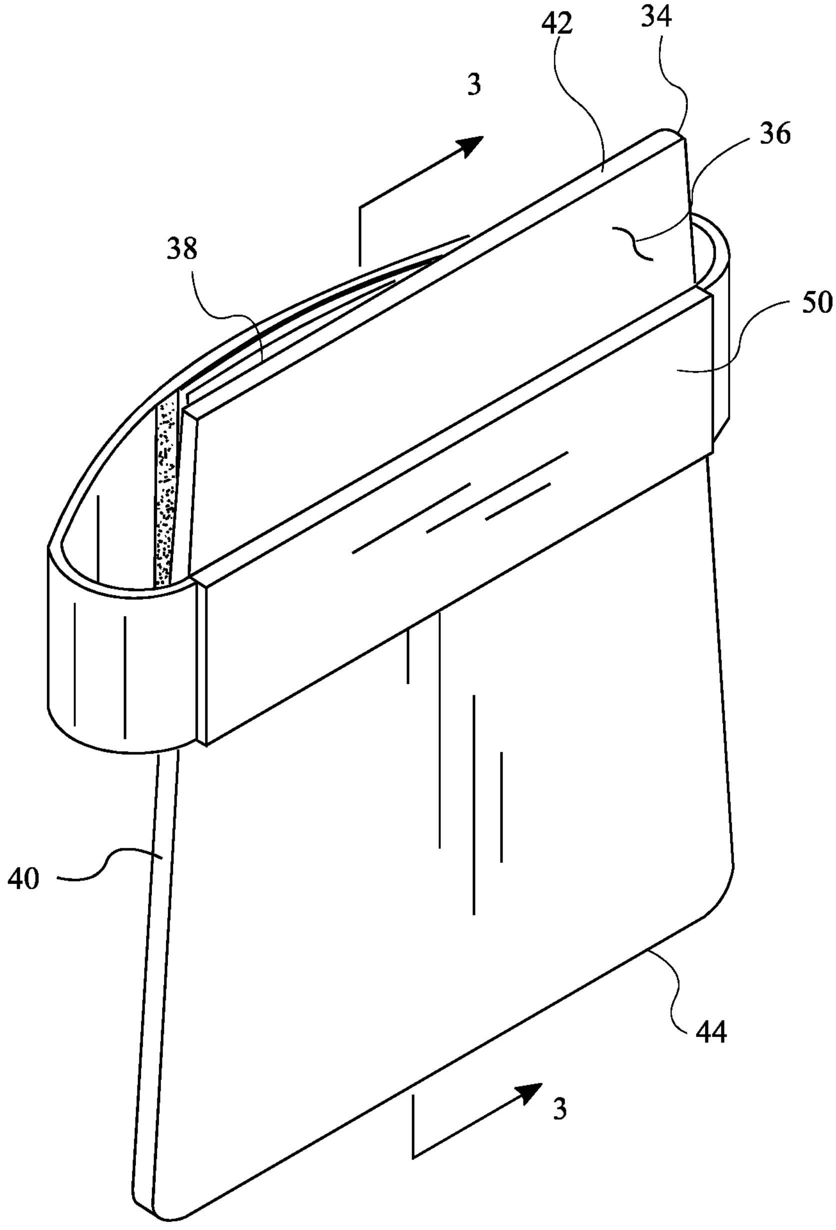
FIG. 2 is a back perspective view of an embodiment of the present invention.
Figure 3:
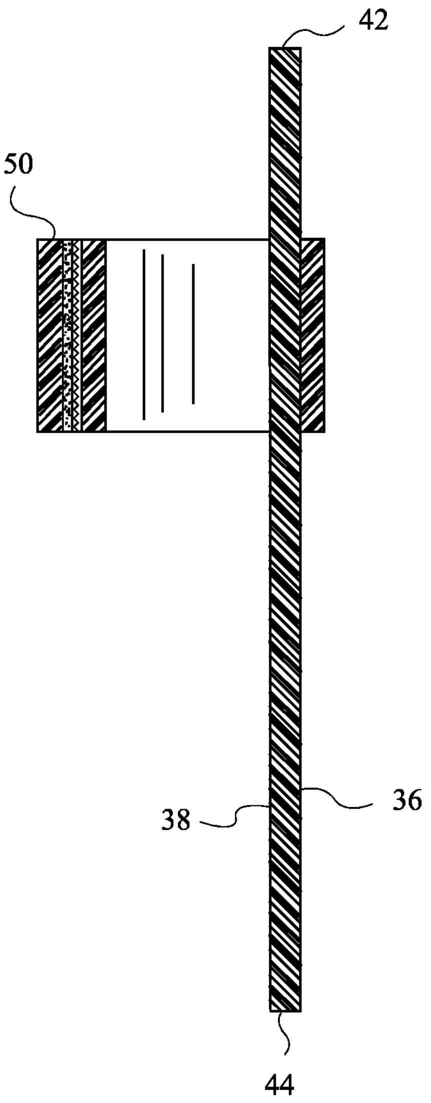
FIG. 3 is a cross sectional view taken along line 3-3 of FIG. 2 of an embodiment of the present invention.
Figure 4:
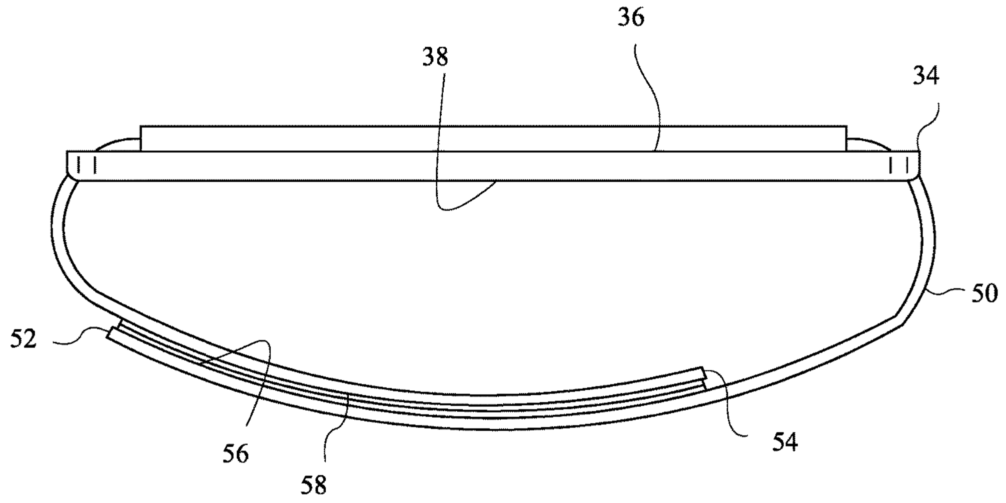
FIG. 4 is a bottom view of an embodiment of the present invention.
Figure 5:
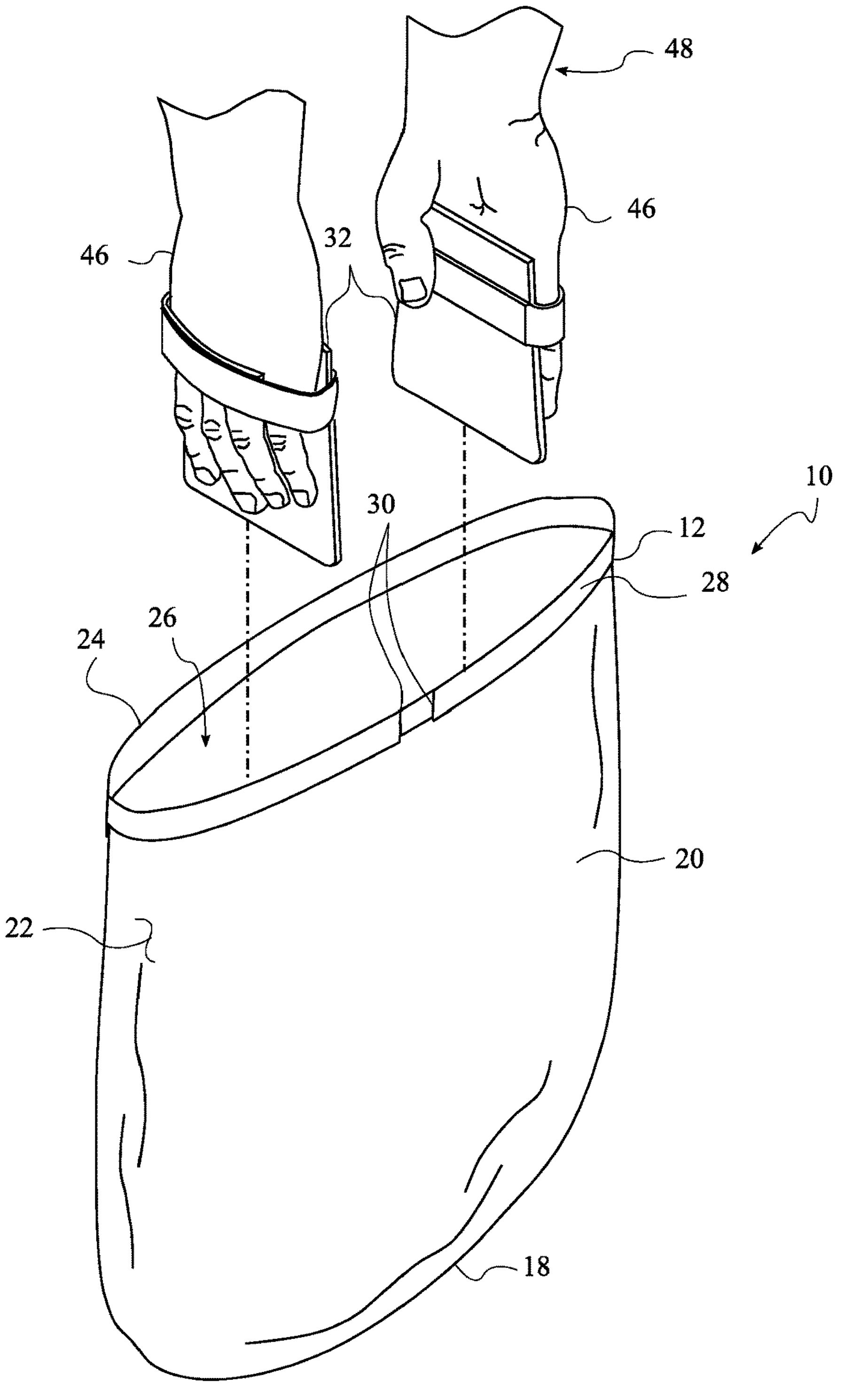
FIG. 5 is a side perspective view of an embodiment of the present invention.
Figure 6:
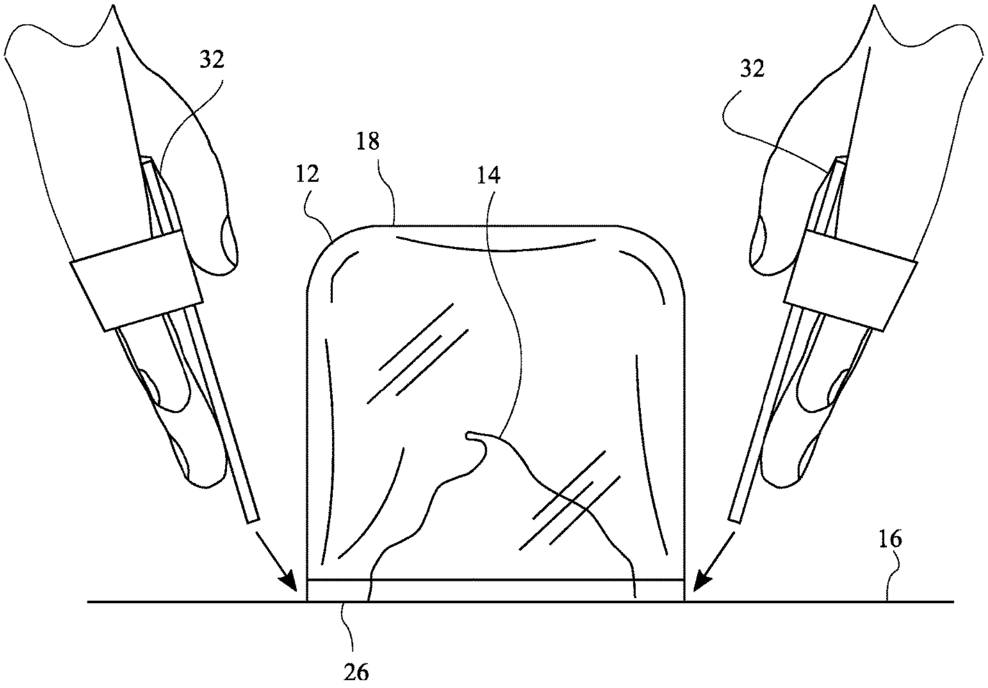
FIG. 6 is a perspective in-use view of an embodiment of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

With reference now to the drawings, and in particular to FIGS. 1 through 6 thereof, a new disposal device embodying the principles and concepts of an embodiment of the disclosure and generally designated by the reference numeral 10 will be described. Herein is disclosed a universal hand grasping device, along with a collection bag for wastes, both standard and hazardous. Integrated with or attached to this invention is one or a plurality of sensors that can detect hazardous chemical, biological, or radiological agents. As the detection unit(s) may be integrated with this device, they also may be individually or collectively detachable (as in a palette connected via a harness leading to a set of instruments) self-contained devices or as a part of an apparatus that is more sophisticated and comprehensive, such as one with a set of processors and gauges that be in a backpack or carried on a cart or baggage carrier.

As best illustrated in FIGS. 1 through 6, the reusable hand scrapers for waste removal 10 generally comprises a pair of scrapers 32. Each of the scrapers 32 may be manipulated to urge animal waste 14 into a bag 12 when the bag 12 is positioned over the animal waste 14. Though the term "animal waste" is used throughout, it should be noted that the present invention can be used in a similar manner for any relevant type of waste or other physical object. In the preferred embodiment of the present invention, the scrapers 32 are reusable and made of a stiff material such as, but not limited to, metal or plastic. In one embodiment, the scrapers 32 are made of a flexible material.

Each of the scrapers 32 comprises a panel 34 that has a first surface 36, a second surface 38 and a peripheral edge 40 extending between the first surface 36 and the second surface 38. The peripheral edge 40 has an upper side 42 and a lower side 44. The second surface 38 may have a hand 46 of a user 48 positioned thereon thereby facilitating the panel 34 to be manipulated. Thus, the lower side 44 urges the animal waste 14 upwardly into the bag 12 when the bag 12 is positioned on the animal waste 14. Furthermore, in one embodiment the lower side 44 comprises a tapered edge 68. The tapered edge further facilitates the lower side 44 to be inserted underneath the animal waste 14. In one embodiment, the panel further comprises a plurality of finger indentations 70 traversing into the second surface 38, as shown in FIG. 7.

Figure 8:
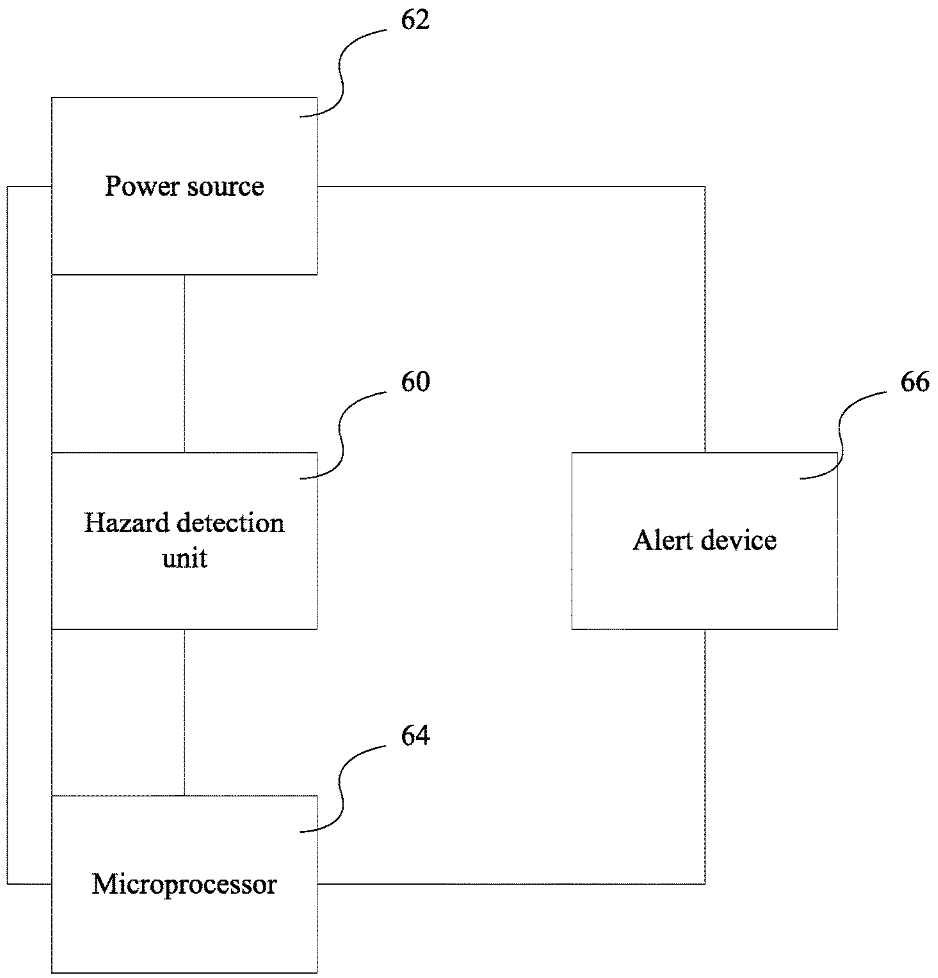
FIG. 8 is a general schematic diagram of the electronic components of an embodiment of the present invention.

In the preferred embodiment of the present invention, each of the scrapers 32 further comprises at least one hazard detection unit 60, a power source 62, a microprocessor 64, and an alert device 66. An example circuit diagram for one embodiment is shown in FIG. 8. In this configuration, the present invention may be utilized in particular to collect potentially hazardous materials. The hazard detection unit 60 will act to detect any hazardous materials and subsequently warn the user through the alert device 66. The microprocessor 64 is electronically connected to the at least one hazard detection unit 60 and to the alert device 66. The power source 62 is electrically connected to the at least one hazard detection unit 60, the microprocessor 64, and the alert device 66. The microprocessor 64, the power source 62, and the alert device 66 may integrated within or onto the panel 34 of the scrapers 32, or may be individually or collectively separate from the scrapers 32, being connected to the hazard detection unit 60 through wired connections or wireless connections. In one embodiment, each hazard detection unit may be permanently integrated into the scrapers 32, or may be individually or collectively detachable, self-contained devices or as part of a larger, more comprehensive apparatus such as a portable unit separate from the scrapers 32. The alert device 66 may be any device which is capable of producing a signal to warn the user of hazardous materials, such as, but not limited to, a light, a speaker, a vibration generator, or another type of alert device. When the hazard detection unit 60 detects a hazardous substance, the alert device 66 is activated to warn the user of its presence.

Figure 9:
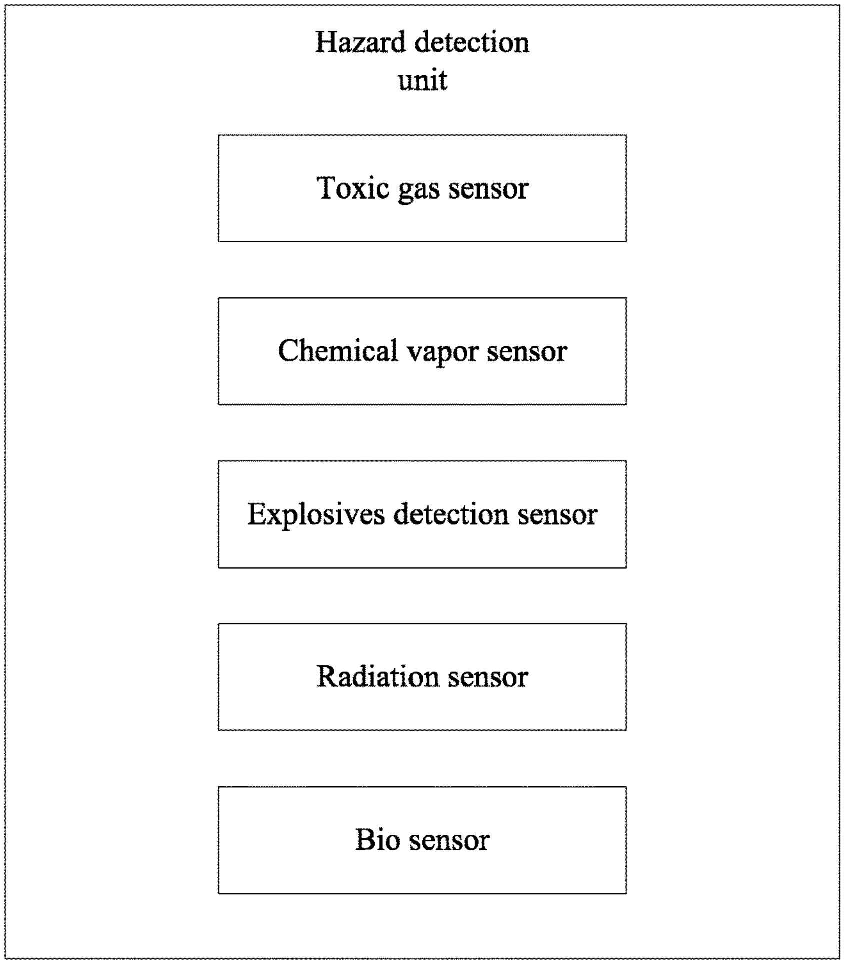
FIG. 9 is a diagram showing possible sensors to be utilized with the hazard detection unit in an embodiment of the present invention.

It is contemplated that any suitable sensor or combination of sensors may be utilized as the hazard detection unit 60. Referring to FIG. 9, In one embodiment, the hazard detection unit 60 comprises a toxic gas sensor or a chemical vapor sensor. In one embodiment, the hazard detection unit 60 comprises an explosives detection sensor. In one embodiment, the hazard detection unit 60 comprises a radiation sensor. In one embodiment, the hazard detection unit 60 comprises a bio sensor for detecting pathogens. Other embodiments may comprise other types of sensors not specifically mentioned herein, and multiple sensors may be comprised in various combinations in various embodiments.

Figure 7:
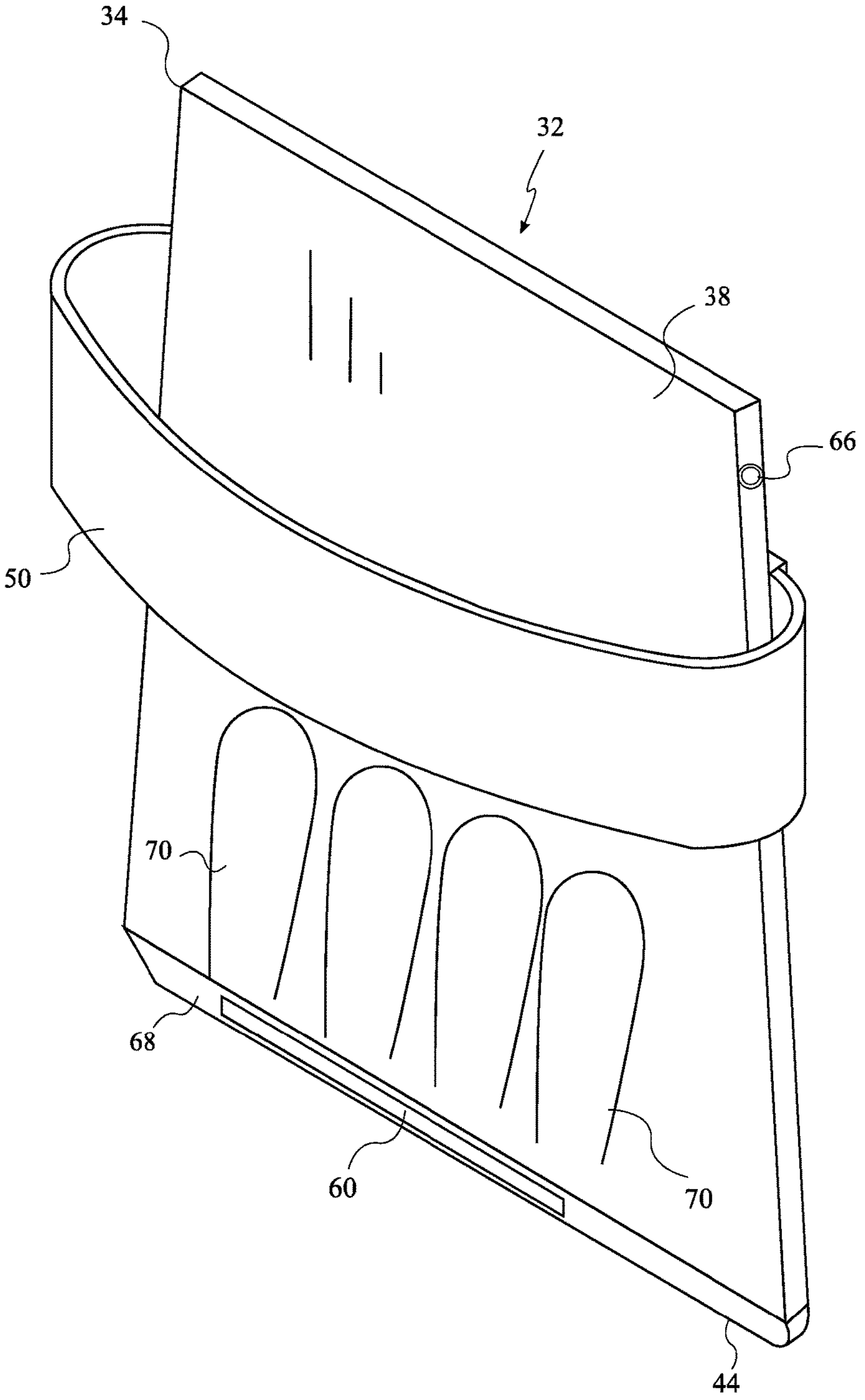
FIG. 7 is a front perspective view of an embodiment of the present invention showing finger indentations, a hazard detection unit and an alert device.

In one embodiment of the present invention, one or more of the hazard detection units 60 is located proximate to the lower side 44 of the panel 34, such as in FIG. 7. This configuration is suited to hazard detection that requires physical contact or close proximity to the hazard. In other embodiments, one or more of the hazard detection unit 60 may be connected to the panel 34 in other locations on the panel 34. For example, detection of chemical vapors may not require a specific location of the hazard detection unit 60 on the panel 34 to detect the vapors.

Furthermore, a bag 12 may be placed over animal waste 14 when the animal waste 14 lies on a support surface 16. The support surface 16 may be ground. The bag 12 has a bottom wall 18 and a peripheral wall 20 extending upwardly from the bottom wall 18. The peripheral wall 20 has an outer surface 22 and a distal edge 24 with respect to the bottom wall 18. The distal edge 24 defines an opening 26 into the bag 12 such that the opening 26 may be positioned to surround the animal waste 14.

A closure 28 is coupled to the bag 12 such that the closure 28 may retain the animal waste 14 in the bag 12. The closure 28 is positioned on the outer surface 22 and the closure 28 is substantially coextensive with the distal edge 24. The closure 28 has a pair of ends 30 such that the ends 30 may be tied together thereby facilitating the closure 28 to close the opening 26. The closure 28 may comprise a string or the like.

A strap 50 is provided that has a first end 52 and a second end 54. The strap 50 is coupled to the first surface 36 and the strap 50 is positioned proximate the upper side 42 of the panel 34. The strap 50 wraps around the panel 34 such that the strap 50 extends along the second surface 38. Thus, the strap 50 maybe wrapped around the user's hand 46. Each of the first end 52 and the second end 54 are matable such that the strap 50 retains the panel 34 on the user's hand 46. The strap 50 should be positioned on the panel 34 such that when in use, the strap 50 is mounted to the user's upper metacarpal bone for optimal leverage when using the present invention. More particularly, when in use around the user's hand the strap 50 should be positioned approximately between the four metacarpal bones and the four phalangeal bones adjacent to the metacarpal bones. Thus, the strap is separated a certain distance from the upper side 42 of the panel 34 toward the lower side 44. For example, in one embodiment, the strap 50 is located one half inch from the upper side 42. In another embodiment, the strap 50 is located one and a quarter inches from the upper side 42.

In one embodiment, the strap 50 is an elastic band. In one embodiment, the strap is made of two separate pieces and is adjustable. Therefore, in one embodiment a first coupler 56 is coupled to the strap 50 and the first coupler 56 is positioned adjacent to the first end 52. A second coupler 58 is coupled to the strap 56 and the second coupler 58 is positioned adjacent to the second end 54. The first coupler 56 and the second coupler 58 are complementary such that the first coupler 56 and the second coupler 58 may retain the panel 34 on the user's hand 46. In one embodiment, each of the first coupler 56 and the second coupler 58 may comprise a hook and loop fastener or the like. In one embodiment, the first coupler 56 and the second coupler 58 may comprise a button snap connection or the like.

In use, the bag 12 is positioned on the animal waste 14 such that the opening 26 surrounds the animal waste 14. Each of the scrapers 32 is coupled to one of the user's hands 46. Each of the scrapers 32 is manipulated to urge the animal waste 14 upwardly into the opening 26 in the bag 12. Each of the scrapers 32 engages the peripheral wall 20 of the bag 12 rather than directly engaging the animal waste 14. The bag 12 is manipulated to be turned upright thereby facilitating the animal waste 14 to fall into the bag 12. The closure 28 is manipulated to close the opening 26 such that the animal waste 14 are contained within the bag 12. The bag 12 is disposed of and the scrapers 32 are retained to be used later.

Figure 10:
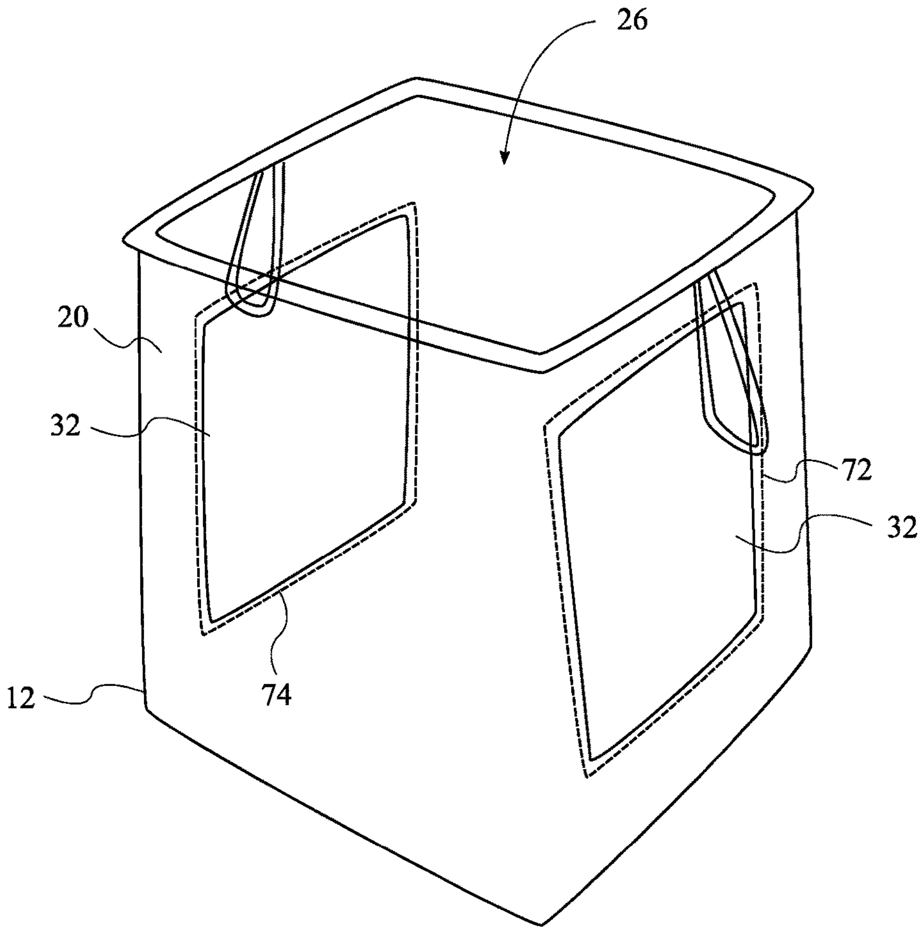
FIG. 10 is a perspective view of an alternate embodiment of the present invention where the scrapers are integrated into the bag.

In one alternative embodiment shown in FIG. 10, the bag 12 comprises a first pocket 72 and a second pocket 74 disposed opposite each other on the peripheral wall 20 of the bag 12. More particularly, the first pocket 72 and the second pocket 74 are positioned on an inner surface of the peripheral wall 20. Thus, the scrapers 32 can me inserted into the first pocket 72 and the second pocket 74 for more convenient manipulation of the scrapers 32 to urge the waste 14 upwards into the bag 12. In another similar embodiment, the bag 12 and the scrapers 32 are connected to each other, with the scrapers 32 being permanently connected within the first pocket 72 and the second pocket 74.

In the case of the present invention being used in a hazardous waste environment, if one or more sensors of the hazard detection unit 60 (all or any of chemical, biological, or radiological sensors) detects the presence of a hazard, the present invention and will emit an indication by sound or visually, as with a flashing light. If the sensors are integrated into the scrapers 32 or bag 12, the situation takes care of itself. If they are not, the sensor(s) is/are attached at appropriate places, as suggested by the figures. In some embodiments, when sophisticated detection is required or where the detection and readout equipment is bulkier, each sensor will have either by radio-transmission or by direct wire) a connection to that equipment, which may be on a cart or backpack, or other carrying device or mode. Such equipment may be remote, if the transmission is wireless. It is expected that such equipment may be integrated into a larger computerized system and its databases.

In use, the two scrapers are placed on the opposite hands of the user with the adjustable strap covering the upper metacarpal bone. The hands are inserted inside the bag, stretching it taut. Now that the scraper is part of the hand it can pull the bag open with resistance against the side of the bag. With the hands near but not on the ground surface the waste is covered in a dome like fashion. Pressure can be exerted by the fingers to flex the scraper and scoop under the waste, meeting in the middle. The weight of the waste now can be used to help assist flipping the bag over so that it is inverted and ready to tie off for disposal. If no waste that has a mandatory special handling requirement (as in hazardous waste) is present, the pocket size scrapers can be reused again as they are clean, having never touched the waste. The unique aspect of the lifters is the adjustable strap that covers the metacarpal bone thereby giving the fingers resistance to flex and go under the covered waste, in addition to the hazard detection unit.

If hazardous waste is detected, an alarm will be triggered, either visually, by sound, or by another method. In one common modality, the user, as the hand is brought close to the material, will see on the band or paddle flashing light and/or hear a beeping sound as a warning. Because the equipment is miniatured, such warning may only be a general warning ("go or no go"), potentially requiring a more sophisticated analysis of exact intensity, quantity, and type of substance being detected.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

Although the invention has been explained in relation to its preferred embodiment, it is to be understood that many other possible modifications and variations can be made without departing from the spirit and scope of the invention as hereinafter claimed.

What is claimed is:

1. A hand scraper system for waste removal comprising:
- a bag;
- a pair of scrapers;
- the bag being configured to be positioned over an animal waste;
- each of the pair of scrapers being configured to be manipulated to urge the animal waste into the bag in response to the bag being positioned over the animal waste;
- each of the pair of scrapers comprising a panel, a strap, at least one hazard detection unit, a power source, a microprocessor and an alert device;
- the panel comprising a first surface, a second surface and a peripheral edge;
- the peripheral edge extending between the first surface and the second surface;
- the peripheral edge comprising an upper side and a lower side;
- the upper side being configured to have a hand of a user positioned thereon;
- the lower side being configured to urge the animal waste upwardly into the bag in response to the bag being positioned over the animal waste;
- the strap being coupled to the first surface;
- the strap being separated from the upper side toward the lower side;
- the strap wrapping around the panel such that the strap extends along the second surface;
- the strap being configured to be wrapped around the hand;
- the microprocessor being electronically connected to the at least one hazard detection unit and the alert device;
- the power source being electrically connected to the at least one hazard detection unit and the microprocessor;
- the panel comprising a plurality of finger indentations; and
- the plurality of finger indentations traversing into the second surface.

2. The hand scraper system as claimed in claim 1 comprising:
- the bag being configured to be placed over the animal waste;
- a closure;
- the closure being coupled to the bag;
- the closure being configured to retain the animal waste in the bag;

the bag comprising a bottom wall and a peripheral wall;
the peripheral wall extending upwardly from the bottom wall;
the peripheral wall comprising an outer surface and a distal edge with respect to the bottom wall;
the distal edge defining an opening into the bag; and
the opening being configured to be positioned to surround the animal waste.

3. The hand scraper system as claimed in claim 2 comprising:
the closure being positioned on the outer surface;
the closure being substantially coextensive with the distal edge;
the closure comprising a pair of ends; and
the pair of ends being configured to be tied together in order to facilitate the closure to close the opening.

4. The hand scraper system as claimed in claim 1 comprising:
the hazard detection unit being positioned proximate the lower side.

5. The hand scraper system as claimed in claim 1 comprising:
the hazard detection unit comprising a toxic gas sensor.

6. The hand scraper system as claimed in claim 1 comprising:
the hazard detection unit comprising a chemical vapor sensor.

7. The hand scraper system as claimed in claim 1 comprising:
the hazard detection unit comprising an explosives detection sensor.

8. The hand scraper system as claimed in claim 1 comprising:
the hazard detection unit comprising a radiation sensor.

9. The hand scraper system as claimed in claim 1 comprising:
the hazard detection unit comprising a bio sensor.

10. The hand scraper system as claimed in claim 1 comprising:
the hazard detection unit being removably attached to the panel.

11. The hand scraper system as claimed in claim 1 comprising:
the lower side comprising a tapered edge.

12. The hand scraper system as claimed in claim 11 comprising:
the hazard detection unit being positioned proximate to the tapered edge.

13. The hand scraper system as claimed in claim 1 comprising:
the strap comprising a first end and a second end;
each of the first end and the second end being matable; and
the strap being configured to retain the panel on the hand.

14. The hand scraper system as claimed in claim 13 comprising:
a first coupler;
the first coupler being coupled to the strap;
the first coupler being positioned adjacent to the first end;
a second coupler;
the second coupler being coupled to the strap;
the second coupler being positioned adjacent to the second end;
the first coupler and the second coupler being complementary; and
the first coupler and the second coupler being configured to retain the panel on the hand.

* * * * *